Sept. 7, 1965  J. A. DREYFUS  3,204,437
LOCK
Filed Dec. 4, 1961  11 Sheets-Sheet 1
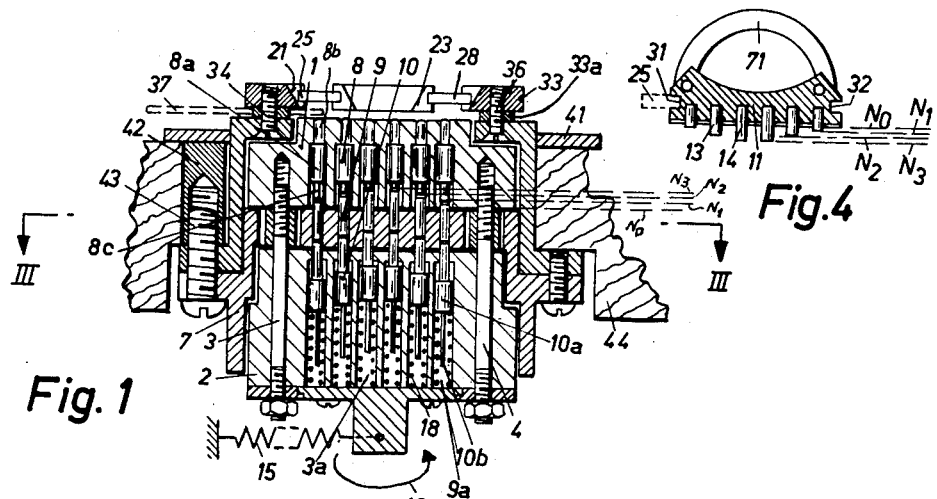
Fig. 1
Fig. 4
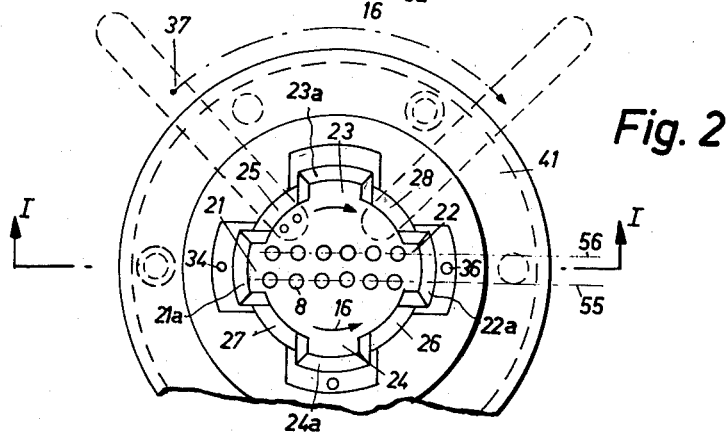
Fig. 2
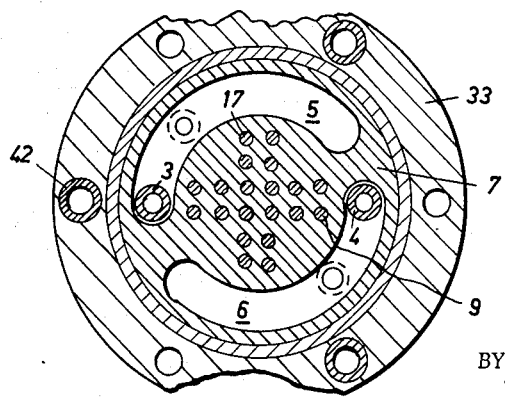
Fig. 3
INVENTOR.
JEAN Albert Dreyfus
BY Werner W. Kleeman
Attorney Sept. 7, 1965  J. A. DREYFUS  3,204,437
LOCK
Filed Dec. 4, 1961  11 Sheets-Sheet 2
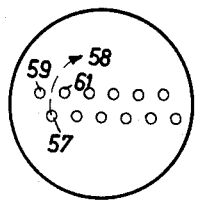
Fig. 5
Fig. 7
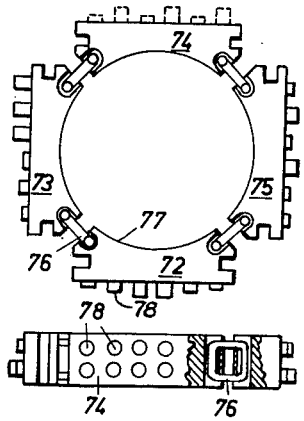
Fig. 6
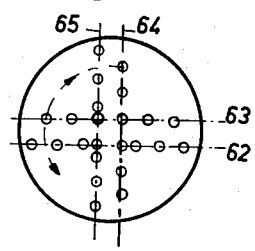
Fig. 8
Fig. 9
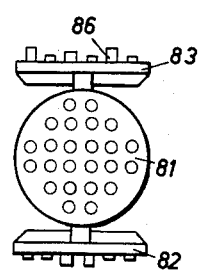
Fig. 10
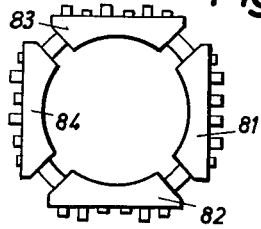
Fig. 11
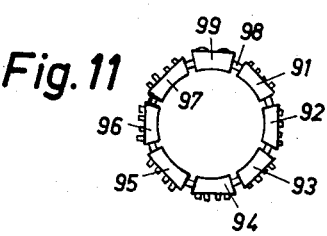
Fig. 12
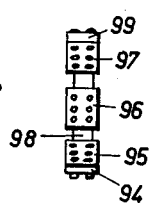
INVENTOR.
Jean Albert Dreyfus
BY Werner W. Kleeman
Attorney Sept. 7, 1965  J. A. DREYFUS  3,204,437
LOCK
Filed Dec. 4, 1961  11 Sheets-Sheet 3

INVENTOR.
Jean Albert Dreyfus
BY Werner W. Kleeman

Sept. 7, 1965  J. A. DREYFUS  3,204,437
LOCK
Filed Dec. 4, 1961  11 Sheets-Sheet 4
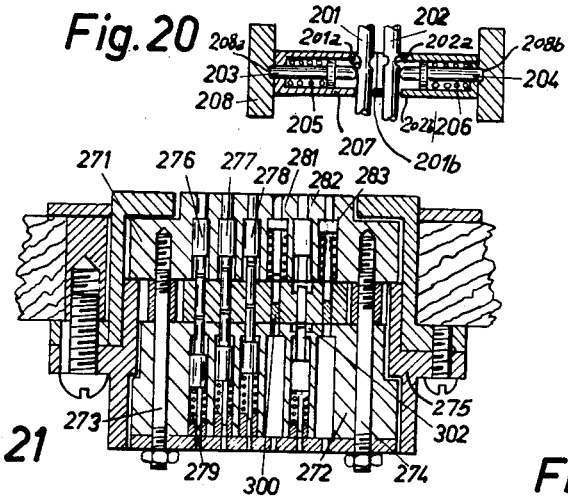
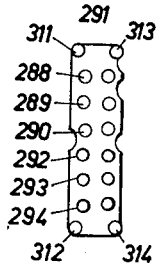
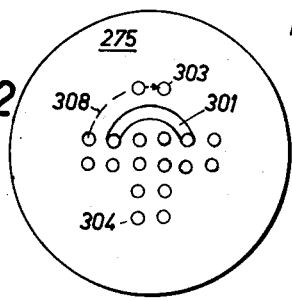
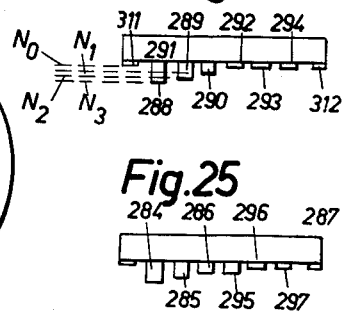
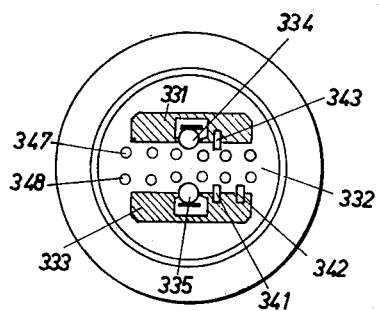
INVENTOR.
JEAN ALBERT DREYFUS
BY
Werner W. Kleeman
Attorney Sept. 7, 1965     J. A. DREYFUS     3,204,437
LOCK Filed Dec. 4, 1961     11 Sheets-Sheet 5

INVENTOR.
Jean Albert Dreyfus
BY Werner W. Kleeman
Attorney

Sept. 7, 1965  J. A. DREYFUS  3,204,437
LOCK
Filed Dec. 4, 1961  11 Sheets-Sheet 6
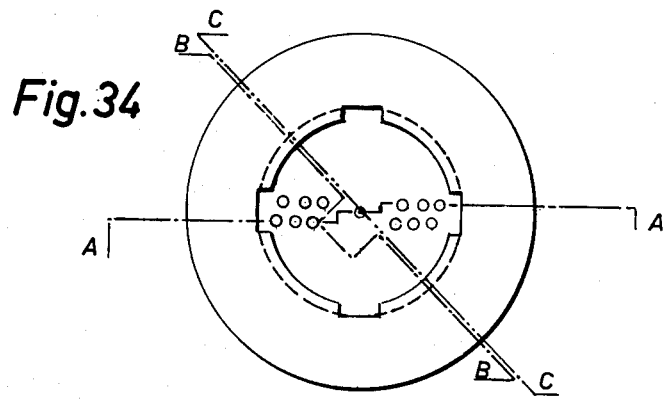
Fig. 34
Fig. 33
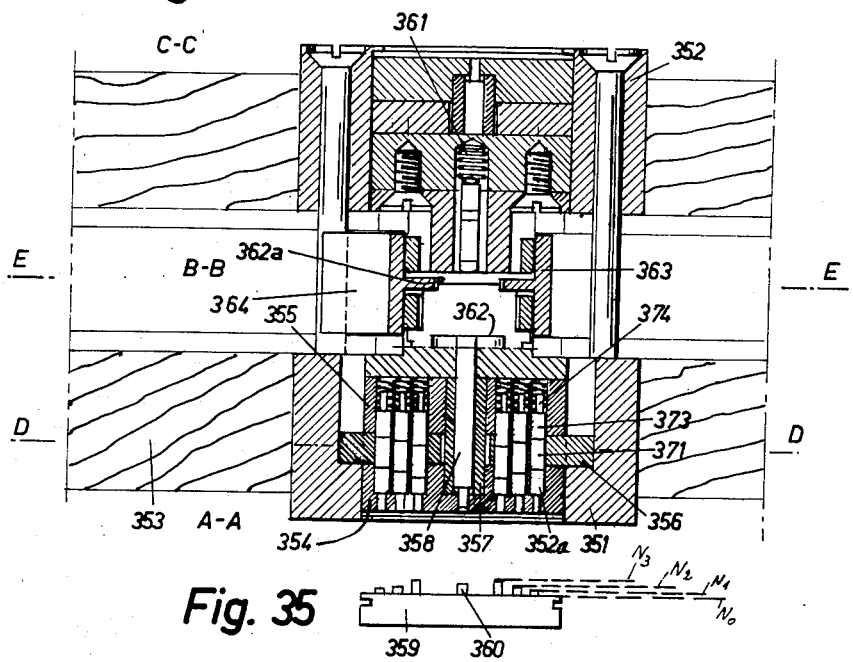
Fig. 35
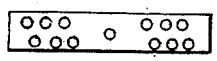
Fig. 36
INVENTOR.
Jean Albert Dreyfus
BY Werner W. Kleeman
Attorney Sept. 7, 1965  J. A. DREYFUS  3,204,437
LOCK
Filed Dec. 4, 1961  11 Sheets-Sheet 7

E-E

INVENTOR.
JEAN Albert DREYFUS
BY Werner W. Kleeman
Attorney

Sept. 7, 1965   J. A. DREYFUS   3,204,437
LOCK
Filed Dec. 4, 1961   11 Sheets-Sheet 8

INVENTOR.
JEAN Albert DREYFUS
BY Werner W. Kleeman
Attorney

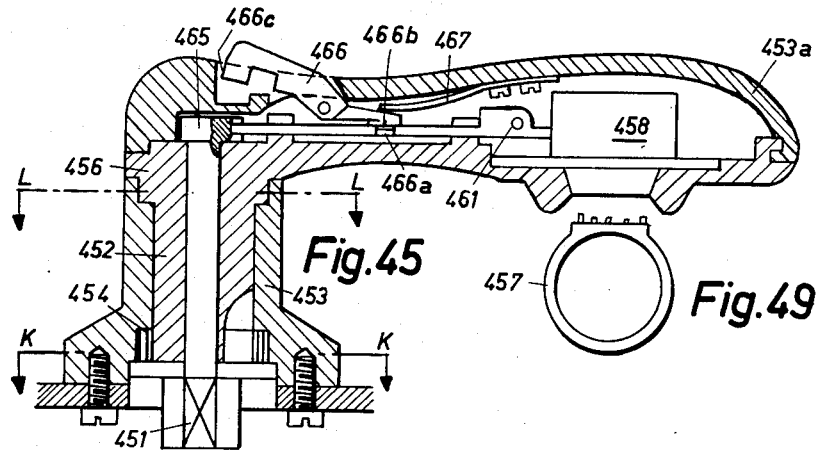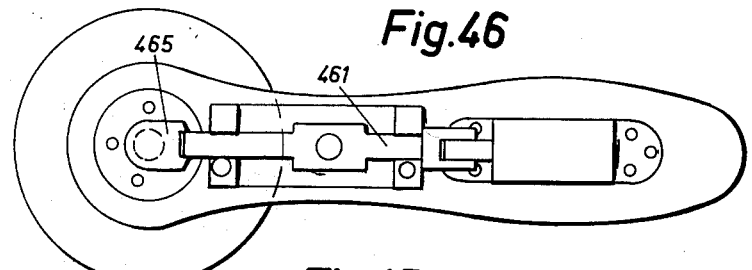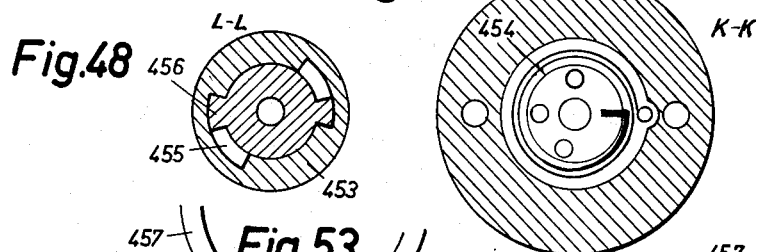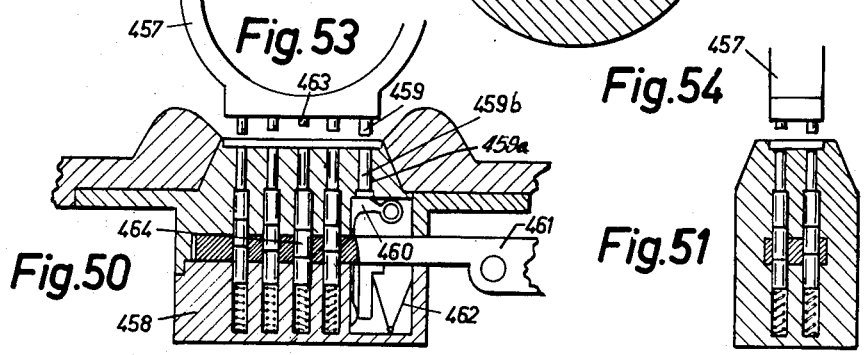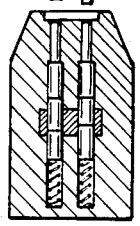

Sept. 7, 1965  J. A. DREYFUS  3,204,437
LOCK
Filed Dec. 4, 1961  11 Sheets-Sheet 10
Fig. 52
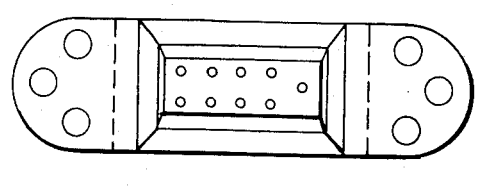
Fig. 55
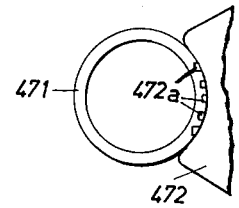
Fig. 58
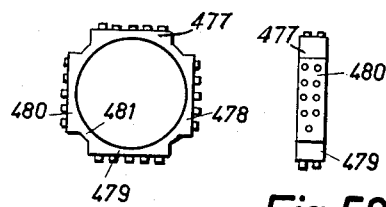
Fig. 56
Fig. 57
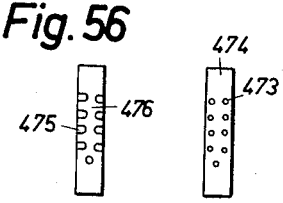
Fig. 59
Fig. 60
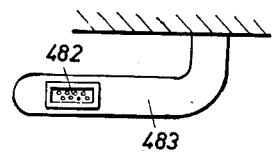
Fig. 61
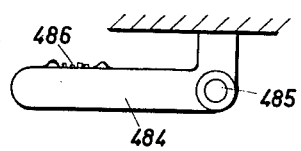
Fig. 62
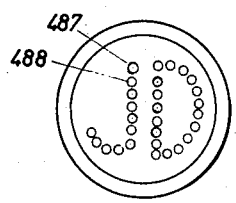
INVENTOR.
JEAN Albert DREYFUS
BY
Werner W. Kleeman
Attorney Sept. 7, 1965    J. A. DREYFUS    3,204,437
LOCK
Filed Dec. 4, 1961    11 Sheets-Sheet 11

INVENTOR.
Jean Albert Dreyfus
BY Werner W. Kleeman
Attorney

United States Patent Office 3,204,437
Patented Sept. 7, 1965

3,204,437
LOCK
Jean Albert Dreyfus, 5 Ave. de La Grenade,
Geneva, Switzerland
Filed Dec. 4, 1961, Ser. No. 156,594
Claims priority, application Switzerland, Dec. 8, 1960,
13,836/60
14 Claims. (Cl. 70—350)

The present invention generally relates to a novel lock and key arrangement and, more particularly, to a frontal lock and key of the type wherein opening of the lock is carried out by displacement of the key in a direction normal to a connecting line of the contact points of said key.

Locks are already known to the art which consist of a number of parallel, movable and separated pin members acted upon by the pressure of individual springs. A collective number of pins must be displaced to a predetermined extent or reference level "0" by means of the contact points of a corresponding key in order that a locking plate member is freed and the lock opened. Each contact point of the key is arranged on a projection or in a recess designed so as to exhibit a specific height difference in relation to the reference level "0". It is possible to collectively provide a number of levels N for a given lock. If for example, the levels "0," "1," "2," "3" are different from one another there results the relationship that $N=4$ levels. Accordingly, the number of theoretically possible lock combinations C can be determined from the equation $C=N^D$, where $D=$number of contact points. Thus, for example, the following chart illustrates the number of lock combinations C possible with a certain number of levels N and contact points D.

| N=2 or 4 | | N=3 |
|---|---|---|
| $2^4 = 4^2 = 16$ | $2^{14} = 4^7 = 16,384$ | $3^4 = 81$ |
| $2^6 = 4^3 = 64$ | $2^{16} = 4^8 = 65,536$ | $3^6 = 729$ |
| $2^8 = 4^4 = 256$ | $2^{18} = 4^9 = 262,144$ | $3^8 = 6,561$ |
| $2^{10} = 4^5 = 1,024$ | $2^{20} = 4^{10} = 1.05 \times 10^6$ | $3^{10} = 59,049$ |
| $2^{12} = 4^6 = 4,096$ | $2^{24} = 4^{12} = 17 \times 10^6$ | $3^{12} = 531,441$ |
| | $2^{48} = 4^{24} = 2.8 \times 10^{12}$ | $3^{24} = 2.8 \times 10^{10}$ |

Keys are also known to the art where the contact points are located approximately in a straight line, with the key being displaced in the direction of the straight line in order to open the associated lock. Such type lock and key arrangement may be conveniently termed "axial." Keys are further known which are displaced perpendicular with respect to a connecting line taken through the contact points in order to open a locking cylinder or plate member, wherein such type of locks are conveniently termed "frontal" or "facial." In such an arrangement the locking plate moves in such a manner that the connecting line of the contact points maintains the same position relative to the plate member. Thus, for example, the contact points are arranged on a circle, the midpoint of which lies on the axis of rotation of the locking plate.

Accordingly, it is an important object of the present invention to provide an improved lock and key arrangement which affords a great degree of security.

Another important object of the present invention is to provide a novelly constructed lock and key arrangement which is highly reliable in operation, economical to manufacture, and not readily subject to clogging by foreign matter or jamming.

A further important object of the present invention is to provide a novel frontal key which is adapted to be combined with an article of jewelry or otherwise, is compact in size and can be worn by a user as an article of jewelry so that the risk of loss or misplacement is substantially minimized.

A further object of the present invention is to provide a key and lock structure which permits relatively simple modification or adaptation of existing jewelry, such as a ring for example, to form said key.

Another important object of the present invention is to provide a novel lock structure which is not easily subject to soiling or jamming by foreign particles, is relatively simple and economical to manufacture, offers a great deal of security, can be locked and unlocked in a very quick and simple manner, and can be employed in a large variety of applications.

Still a further object of the invention is to provide a novel lock arrangement which permits of use with individual keys as well as pass keys.

In accordance with one aspect of the present invention at least one connecting line between two neighboring contact points of the key is preferably arranged at substantially right angles to the direction of movement of the key into its unlocking position, and further, together with the direction of movement of the freed or liberated locking cylinder or plate forms an angle which approximately lies between 30° and 90°. In other words, after the key is inserted in the lock to open the latter the key is turned through the aforesaid angle. Preferably, the contact points of the key, which may be positive or negative, are distributed on a carrier or support surface in a manner similar to the junction points of a lattice or netting. More specifically, the contact points are preferably arranged approximately along two parallel lines defining a surface and where, for example, the two rows of contact points may from time to time be offset from one another by approximately one-half the distance between a pair of adjacent contact points. It is of course contemplated that the contact points could be arranged along a straight line or that they be randomly distributed.

The lock arrangement of the present invention is featured in the provision of a lock housing having at least two relatively movable cylinders or plate members provided with a number of bores adapted to receive slidable pin members. At least some of the pin members cooperate with one of said plate members defining a normally locked plate or cylinder which will be freed when the correct key is applied to the lock. The pin members and associated spring means are so constructed and arranged that for all practical purposes the lock cannot be easily probed to determine the secret thereof, and consequently there prevails a high degree of security. The pin members and spring means are suitably constructed and dimensioned so that they can cooperate with suitable stop means provided in the associated bores in order to limit the displacement of said pin members to a desired extent. Further, in accordance with the present invention there is provided a novel key structure which is substantially miniaturized in comparison to existing key structures and can be readily employed in conjunction with a finger ring, as by being formed integral therewith or secured thereto, to produce a finger ring key which is provided with one or more individual key elements.

Generally speaking, there is contemplated a frontal type lock arrangement provided with a lock housing including at least a pair of relatively movable plate members, with one of said plate members being adapted to displace an operable member to perform an unlocking action. The relatively movable plate members are further provided with a plurality of bores and pin members arranged for sliding movement within said bores. Additionally, stop means cooperate with said pin members to permit at least some of said pin members to be displaced a predetermined extent which is different from the degree of displacement of said pin members when actuated for unlocking of said lock, whereby said lock cannot be probed to determine the combination thereof, with a high degree of security thus prevailing. Further, the frontal type key member adapted to be employed in conjunction with a lock of the type previously described comprises a key body provided with a plurality of contact points adapted to actuate corresponding contact points of the lock member, with said contact points of said key body simultaneously acting upon said contact points of said lock member upon contact therewith. As will become evident from the detailed description to follow, many modifications are possible and the key and lock arrangement finds many applications in everyday use and for a variety of purposes.

The present invention results in a number of completely new advantages, namely: (a) the key member can be reduced in size or miniaturized to such an extent that it may be carried without discomfort or inconvenience on a finger ring for example. Further, a small number of contact point levels N, such as for example between 2 and 4, requires a very limited embossing of the finger ring, and a relatively large number of contact points (for example between 6 and 12) results in such a large number of possible lock combinations that the key secret for all practical purposes remains undetectable. (b) The contact points can be brought into coincidence with several points provided on a purely decorative ring so that from the exterior the key, for example, can no longer be distinguished from a normal finger ring. (c) The contact points can be formed on the two sides of the surface portion of a finger ring by means of notching or otherwise, whereby with the smallest amount of modification it is possible to alter a normal finger ring into a finger ring key.

Additionally, the following advantages are also of noteworthy consideration: (a) The lock no longer requires a hole or opening and the movable pins can extend up to the outer surface of the lock so that only a small surface portion is visible. Additionally, the lock is extremely resistant to soiling and it is waterproof. (b) A larger number of keys requires a minimum amount of space. For example, two to four keys can be conveniently arranged about the same finger ring. (c) It is possible to open a lock with the aid of a single finger and without the necessity of reaching into one's pocket or undertaking the normal risk of losing or forgetting one's key. (d) By virtue of the very large number of lock and key combinations compatible with a minimum area, it is possible to construct pass keys for different persons and lock categories.

Further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIG. 1 is an elevational cross-sectional view of a frontal lock designed according to the teachings of the present invention and taken along the lines I—I of FIG. 2;

FIG. 2 is a top plan view of the lock shown in FIG. 1;

FIG. 3 is a cross-sectional view of the lock shown in FIG. 1 and taken along the line III—III thereof;

FIG. 4 is a sectional view of a ring adapted to be used with the lock of FIGS. 1–3;

FIG. 5 illustrates a modified arrangement of the pin members of the lock arranged offset with respect to one another;

FIG. 6 illustrates a modified form of intermediate plate member adapted for use with the lock of FIG. 1;

FIGS. 7 and 8 are a front and end view, respectively, of a finger ring key provided with four key members according to the present invention;

FIGS. 9 and 10 are an end view and a side view, respectively, of a further form of finger ring key;

FIGS. 11 and 12 are a side view and end view, respectively, of another form of finger ring key;

FIG. 20 is a cross-sectional view of a portion of a further embodiment of a lock arrangement designed according to the present invention;

FIG. 21 is an elevational cross-sectional view of a further embodiment of a lock of the present invention;

FIG. 22 shows the details of the intermediate plate member of the lock of FIG. 21;

FIGS. 23 and 24 are a side and front view of a pass key for the lock of FIG. 21;

FIG. 25 is an end view of an individual key for the lock of FIG. 21;

FIG. 27 is a modified arrangement of an intermediate plate member adapted for use in the lock of FIG. 21;

FIG. 28 is a top plan view, partly in cross-section, of a lock provided with a guide arrangement for the key member;

Figure 37:
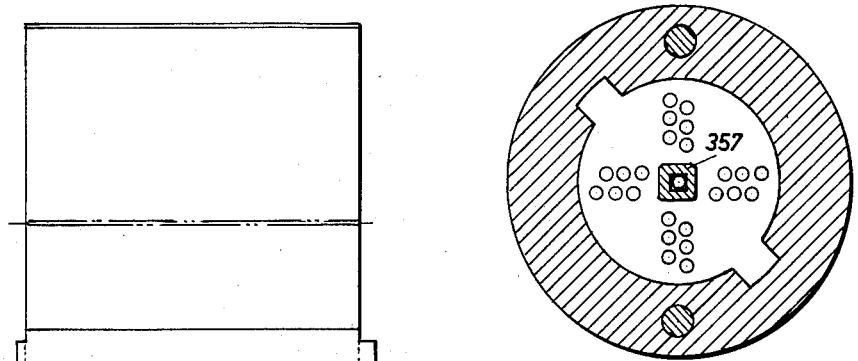
Figure 38:
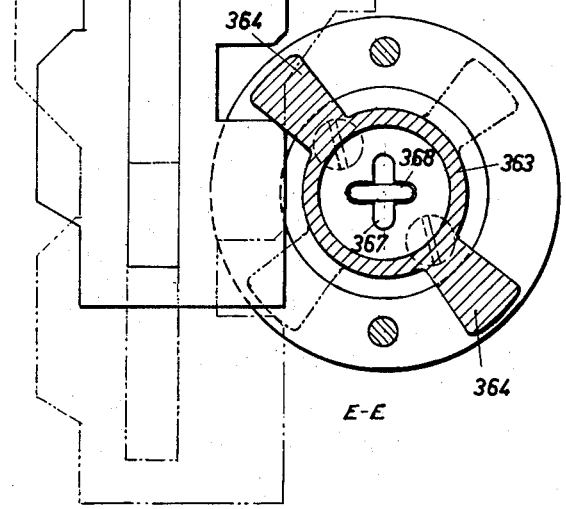
Figure 43:
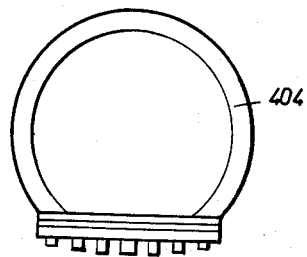
Figure 44:
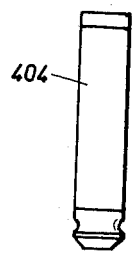
Figure 39:
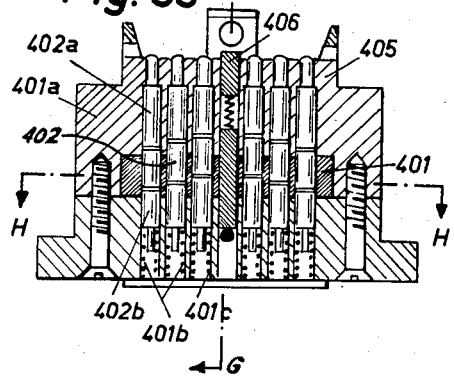
Figure 41:
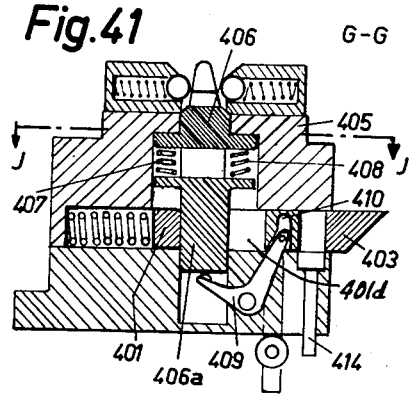
Figure 40:
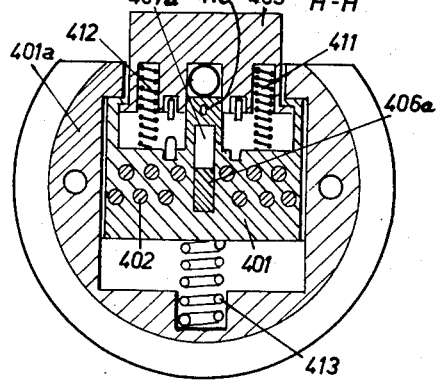
Figure 42:
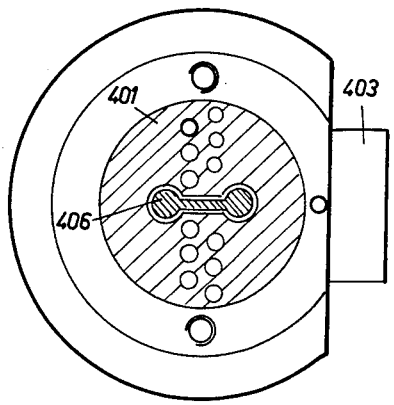
Figure 63:
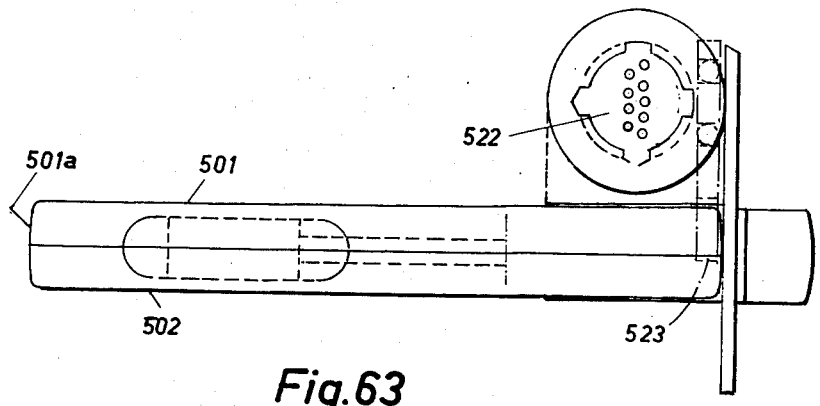
Figure 64:
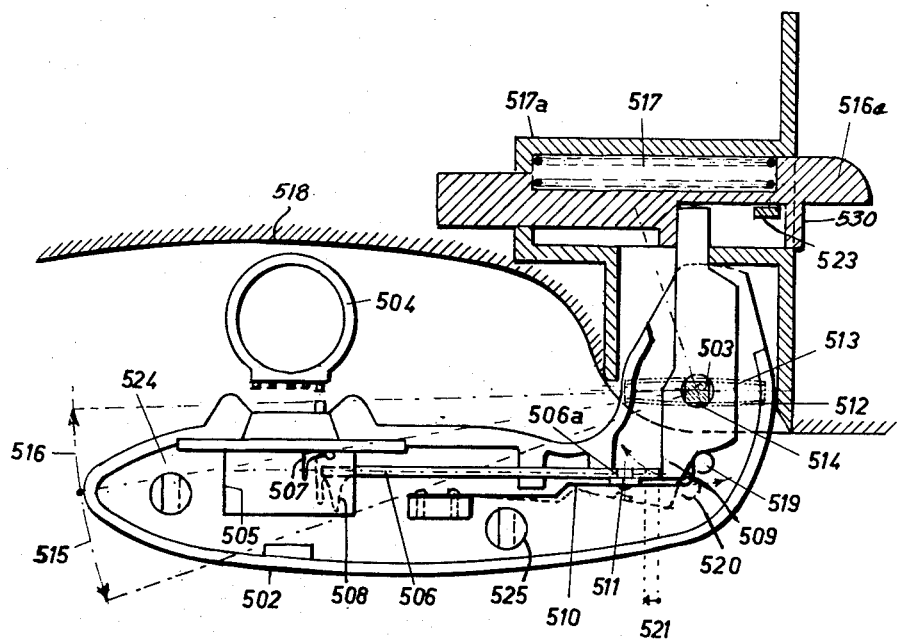

FIG. 33 is a cross-sectional view of a further embodiment of a double-face lock arrangement of the present invention; the upper portion labeled C—C is a cross-sectional view along the lines C—C of FIG. 34; the intermediate portion labeled B—B is a cross-sectional view taken along the lines B—B of FIG. 34; and the lower portion labeled A—A is a cross-sectional view taken along the lines A—A of FIG. 34;

FIG. 34 is a top plan view of the lock arrangement of FIG. 33;

FIGS. 35 and 36 are a side and front view, respectively, of a key for the lock of FIG. 33;

FIG. 37 is a cross-sectional view of the lock taken along the lines D—D of FIG. 33;

FIG. 38 is a cross-sectional view of the lock taken along the lines E—E of FIG. 33;

FIG. 39 is an elevational, cross-sectional view of a further embodiment of a lock designed according to the present invention;

FIG. 40 is a cross-sectional view of the lock shown in FIG. 39 and taken along the lines H—H thereof;

FIG. 41 is a cross-sectional view of the lock of FIG. 39 and taken along the lines G—G thereof;

FIG. 42 is a cross-sectional view of the lock of FIG. 41 and taken along the lines J—J thereof;

FIGS. 43 and 44 are a front and end view, respectively, of a key member for the lock illustrated in FIGS. 39–42;

FIG. 45 is a cross-sectional view of a further arrangement of a lock combined with a hand grip;

FIG. 46 is a top plan view of the arrangement of FIG. 45 with the cover thereof removed;

FIG. 47 is a cross-sectional view of a lock of FIG. 45 taken along the lines K—K thereof;

FIG. 48 is a cross-sectional view of the lock of FIG. 45 taken along the lines L—L thereof;

FIG. 49 is a side view of a key for the lock of FIG. 45;

FIG. 50 is a fragmentary, cross-sectional view showing details of the lock of FIG. 45;

FIG. 51 is a cross-sectional view of the lock of FIG. 50;

FIG. 52 illustrates details of the mounting plate for the lock unit of FIG. 45;

FIGS. 53 and 54 are a side and end view, respectively, of the key arrangement for the lock of FIGS. 45–52;

FIG. 55 illustrates a fragmentary view of a key and lock arrangement provided with negative contact points;

FIGS. 56 and 57 show further possible arrangements of the contact points for the key;

FIGS. 58 and 59 illustrate a front and end view, respectively, of a further form of finger ring key;

FIGS. 60 and 61 illustrate further possible arrangements for a lock combined with a hand grip;

FIG. 62 illustrates a top view of a signet ring provided with actual and fictitious contact points;

FIG. 63 is a front view of a lock arrangement combined with a hand grip and including a security lock;

FIG. 64 is a top cross-sectional view of the lock of FIG. 63 showing the details of the interior thereof.

Referring now to the drawings and more particularly to FIGS. 1–4, the frontal lock of the present invention by way of example consists of a lock housing including two rotatable cylinders or plate members 1 and 2 connected with one another for example by the fastening screws 3 and 4. Between the movable plate members 1 and 2 there is arranged a fixed cylinder or plate member 7 provided with a pair of arcuate or semi-circular slots 5, 6 (FIG. 3). The fastening screws 3 and 4 are arranged in such a manner that they may freely slide within these arcuate slots 5, 6. The rotatable cylinder or plate members 1 and 2 as well as the intermediate fixed cylinder 7 are provided with a given number of chambers or bores 3a, as for example twelve in number.

The rotatable plate members 1 and 2 are blocked in their rest position relative to the fixed plate 7 by means of twelve groups of three coaxially arranged contact pins 8, 9, 10 with each pin grouping being arranged in one of the aforementioned bores 3a. In other words, as long as a key 11 (FIG. 4) does not apply a suitable pressure via the contact points or faces of the contact members 13, 14 on the corresponding contact pins 8, 9, 10 for opening the lock such will remain closed. Each of the groups of pins 8, 9, 10 are displaced into their blocking or locking position by means of a respective spring member 18 arranged in the lower end of each bore 3a and abutting against an associated driver pin member 10. It is to be appreciated that the intermediate barrel portion 8a and upper pin extension 8b of the pin members 8 may advantageously be similar in length. Thus, in the blocked position of the lock all of the uppermost pins 8 arranged in the outermost rotatable plate member 1 extend to the same level of the outer surface of this plate member. Consequently, pin members 8 when viewed from externally of the lock are not distinguishable from one another. It is thus impossible to take an impression of the lock which will reveal its secret since all of the barrel portions 8a will move downwardly the same extent to abut against the upper surface of the intermediate plate member 7 defining a stop surface. Of course other measures could be undertaken to render the lock relatively hard to detect or undetectable, such as providing separate stop means such as spacers or other known expedients which limit the displacement of the pin members 8, 9, 10 to a desired extent or level different from the unlocking levels. To further safeguard against probing of the lock to determine its combination, the pin members could be designed so as to differ from one another in weight by forming such from different materials. Further, the springs 18 could be designed to vary in strength from one another. It is particularly important in safeguarding against testing of the lock that the spatial distribution of the mass appearing in each bore or the spring strength be such that they either are equal to one another or do not correspond to the particular pin level for the unlocking level provided for each bore of the lock, so that the security of the lock is protected.

However, when the key 11 with its contact members or projections 13, 14, and which are arranged for example at four levels $N_0$, $N_1$, $N_2$, $N_3$, are inserted into the corresponding bores of the lock and displace the intermediate pins 9 until they attain the same level, that is to say, their opposite ends lie substantially flush with the opposed outer faces of the intermediate fixed plate 7, then the movable plates 1 and 2 are set free and it is possible to rotate them through an angle of approximately 90° for example. The rotational movement of the cylinders or plate members 1 and 2 can be employed to open a suitable bolt or locking member in a manner known to the art. If the rotatable plate members 1 and 2 remain in a position intermediate the locking and unlocking position then the outermost pins 8 will no longer be flush at their upper ends with the outer surface of the plate member 1, and consequently, the secret of the lock can possibly be determined.

In order to prevent this, a number of positive measures can be singularly or collectively undertaken. For example, as shown in FIG. 1 a return spring 15 can be provided which for example extends from a bolt and automatically returns the lock into its rest or locking position, in the direction of 16, as soon as the key 11 is withdrawn from the lock. Additionally, the stationary intermediate plate member or cylinder 7 may be provided with two groups of intermediate pins 9 and 17 (FIG. 3) arranged cross-shaped to one another so that there is provided two positions of rest for the lock which are displaced 90° from one another; and whereby in both such rest positions the secret of the lock is protected. Further, in order to prevent that the key will inadvertently be withdrawn from the lock when in an intermediate position, it is possible to provide four arcuate segments or rails 25–28 which serve as guiding members and are arranged between four U-shaped frames or guide walls 21a–24a forming tapered or conical openings 21–24. The openings 21–24 defined by the guide walls 21a–24a facilitate insertion of the key into the lock. In such an arrangement the key member 11 is provided with corresponding recesses 31, 32 which permit relative sliding movement between said key member and said rails. The rails 25–28 are secured to a support ring 33 resting upon spacers 33a and connected to the stationary plate member 7 by means of the fastening screws 34 to 36. Thus, the key cannot be inadvertently withdrawn until it has reached one of its end positions.

Between the guide rails 25–28 and the support ring 33 there is formed an empty space in order to facilitate the removal of fluids or dirt. In this empty space a lever 37 can be inserted, if desired, which can be used as an ignition key for an automobile or otherwise. In such an arrangement, it is then possible to dispense with the crosswise arranged pins 17 and the lever 37 permits immediate braking of ignition contact and return of the lock into its locked position without the aid of the key. A guard or face plate 41 can be provided with the nut members 42 so that the lock may be secured to the inside of a door 44 or otherwise with the aid of the threaded bolts 43 for example. As a result, the entire unit is mountable from within.

As previously mentioned, each outer pin member 8 may consist of a widened central barrel portion 8a and two opposed small end portions 8b, 8c. The outermost end portions 8b may all be equal in length, whereas the innermost end portions 8c differ in length and correspond to the respective levels of the associated contact pin members 13, 14 of the key 11. Similarly, each lower pin member 10 in the rotatable plate 2 consists of a central wide barrel portion 10a and a narrower extended shaft portion 10b. All of these lower pin members 10 may also be equal in length and thus exchangeable with one another. Further, the intermediate pins 9 are also equal in length. Consequently, the only variable dimension of the lock of this embodiment is the length of the innermost shaft end 8c of the various outer pin members 8. Analogously, the only variable size or dimension of the key 11 is the height of the corresponding projections 13, 14 which therefore greatly simplifies and economizes manufacture, notwithstanding the large number of possible key combinations. Naturally, as previously mentioned the mass of the pin members of each respective bore preferably differ from at least some of the remaining bores, especially respective bores possessing pins of the same level, so that the lock is for all practical purposes untestable.

It is to be appreciated that, the guide walls 21a–21d forming the guide openings 21–24 for the key 11 can be secured directly to the rotatable plate member 1 if one dispenses with the guide rails 25–28. However, the following disadvantages can result if the guide rails are not provided: Since two parallel rows of pins are parallely arranged on a surface, and along the axes 55, 56 (FIG. 2), the upper pins of one row can become stuck in the lower holes of another row. In order to further avoid such disadvantage the two rows can be offset with respect to one another, as for example shown in FIG. 5. Thus, if the pin 57 is displaced in the direction of arrow 58, then this pin member 57 moves between the corresponding bores provided for the adjacently arranged pins 59 and 61 without the danger existing that pin member 57 will become lodged in one of these bores. As shown in FIG. 6, it is also possible to arrange the bores of the fixed plate in a cross-like manner along a pair of axes 62, 63 and 64, 65, with the pins offset from one another for reasons previously explained.

The key member 11 of FIG. 4 is mounted upon the surface portion of a semi-circular ring member 71 which is adapted for example to be grasped between two fingers of a user. Contrary to such an arrangement, in FIGS. 7 and 8 there is shown a variant form of the invention where a key 72 is mounted upon a ring body 73–75 which can be worn on the finger. The finger ring key can be formed for example of four key members 72 to 75, which may be held together by means of adjustable connecting members 76. Such an arrangement permits the internal diameter of the ring to be easily accommodated to the finger of a user. The contact pins 78 of the key members 72–75 may be formed from precious stones or a suitable metal. It is also possible to conceal the contact pins by means of a decorative motif provided for the ring.

In the example depicted in FIGS. 1–4, and by way of illustration the number of contact points $D=12$ and the number of levels $N=4$. Consequently, the thus shown lock possesses $C=4^{12}=17\times 10^6$ mathematically possible key combinations. One can appreciate that in actual practice this corresponds to approximately 15 million actual or useable lock possibilities, so that it can readily be appreciated that a high degree of security exists. In FIGS. 9 and 10 there is disclosed a ring member which may be formed of one to four signet ring plate members 81–84, whereby it is possible for example to apply to each plate member twenty four contact points according to one of three possible levels. Such an arrangement results in $C=3^{24}$ possible combinations, that is, approximately 250 billion different key combinations. Since FIGS. 9 and 10 are depicted in the scale of approximately 2:1 it is easily possible to visualize the possible degree of miniaturization.

Figures 13, 14, 15:
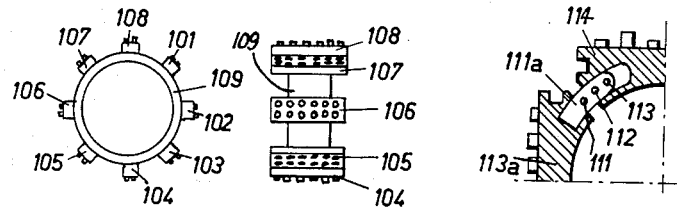
FIGS. 13 and 14 illustrate a side and end view, respectively, of a further possible finger ring key arrangement.
FIG. 15 is a fragmentary, cross-sectional view of means for adjusting the size of a finger ring key.

In the variant form of finger ring keys of FIGS. 11 and 12 it is possible to thread or otherwise secure seven keys 91–97 on an annular or circular band 98 having a rectangular cross-section. This forms a ring member which can comfortably be worn on a finger. The eighth side portion 99 of the octagon can serve as a lock catch or closure portion for the ring, whereby the desired length of the ring band 98 may be adjusted. In this variant form there are provided for example eight contact points for each key with $N=4$ levels. This results in the possible key combinations of $C=4^8=65,536$ which as a practical matter results in approximately 60,000 definite key possibilities. In a further variant form of finger ring key as shown in FIGS. 13 and 14, there are provided eight keys 101–108 each of which is provided with twelve contact points. The key members 101–108 are arranged transverse to the ring body 109 and are positioned so as to be adjustable and detachable.

Figure 17:
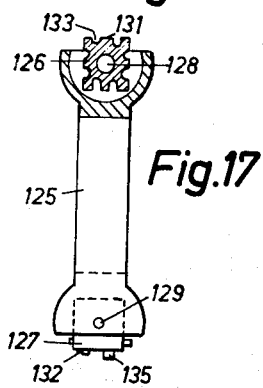
FIG. 17 is an end view, partly in cross-section, of another form of finger ring key.
Figure 16:
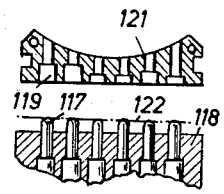
FIG. 16 is a fragmentary cross-sectional view of a key and lock arrangement provided with negative contact points and adapted to be used in conjunction with any of the embodiments disclosed herein.

In FIG. 15 there is illustrated a fragmentary view of the details of an adjustable connecting member 111a provided with three adjusting holes 111, 112, 113 which permits adjusting the distance between two adjacent key members 113a, 114. In FIG. 16 there is shown a further modification of the key and lock arrangement of the present invention wherein the pins or positive contact points 117 of the lock 118 and the corresponding bores 119 of the key 121 are reversed in relation to the various arrangements previously described. Thus, it is to be appreciated and understood that one or the other of these possible arrangements can be employed with any of the embodiments disclosed herein as desired. Depending on the particular situation or condition of use one or the other arrangement will prove to be more advantageous. In the embodiment shown in FIG. 17 it is possible to construct the key member 125 so as to rotatably support a plurality of cubes 126, 127 which may be selectively rotated about a respective axis 128, 129. Each of the side portions 131, 132 of the cube members 126, 127 respectively, can be provided with a positive or negative contact point arrangement 133 and 135, respectively, and forming a key member. Consequently, it is possible to produce with a single ring possessing four cube members a bank of sixteen keys. It is of course to be appreciated that any member of possible ring shapes and key members can be employed as will readily suggest itself from the teachings herein.

Figures 18, 19:
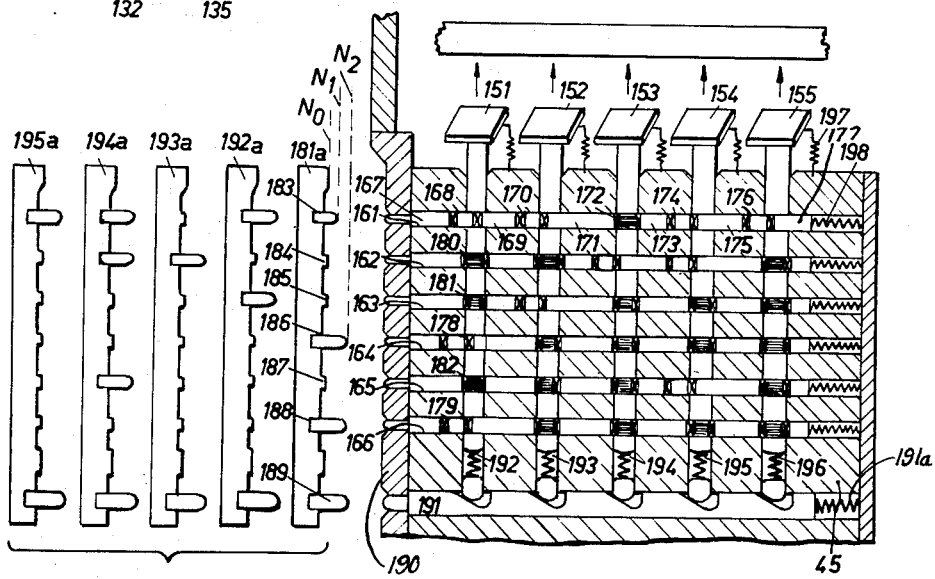
FIG. 18 is a cross-sectional view of a lock provided with a plurality of serially arranged lock members.
FIG. 19 illustrates the keys adapted for use with the lock arrangement of FIG. 18.

In FIG. 18 there is shown a modified form of lock arrangement wherein rotation of the key for opening of the lock is not necessary, which lock is of the type having a lock housing 45 provided with the respective movable operable members in the form of actuating rods 151–155 of five locks which are situated behind one another. The individual operable rod members 151–155 and the lock housing 45 are pierced by six axially arranged bores 161–166. Each of these bores are divided into eleven sections, each of which sections are provided with a pin member conveniently labeled by reference numerals 167–177. Each actuating rod 151–155 is blocked by means of the pin segments such as 168, 178 and 179, and which only partially extend into an associated bore of the associated actuating rod, such as actuating rod 151. In contradistinction the other pin segments 180–182 which extend completely within an associate bore of the associate actuating rod 151 are neutral in their function, that is to say, they do not influence a blocking or locking action on the cooperable actuating rod 151. The pin segments 168, 178, and 179 are designed to extend a predetermined depth into the provided bore of the actuating rod 151 and correspond to two definite levels $N_1$ and $N_2$ for instance.

If one assumes, for example, that the key 181a (FIG. 19) is displaced to the right so that the contact pins 183 and 189 extend through the wall 190 then the following occurs: The pin member 189 displaces the lowermost rack 191 against the action of spring 191a and which rack provides a force direction changing member which influences or acts upon the spring members 192–196 arranged in the bottom portion of housing 45. These spring members 192–196 are provided for the purpose of displacing the associated movable operable members 151–155 into their unlocking position when the blocking means in the form of the aforedescribed pin members are moved into their proper position for freeing said operable members upon insertion of the proper key. On the other hand, the contact pin members 184, 185, 187 which correspond to level $N_0$ do not displace the pins of the lock of the first actuating rod 151. Moreover, the contact pin 183 which corresponds to the level $N_1$ displaces the corresponding blocking pins within the bore 161 a predetermined amount. Further, the pins 186, 188 of the key 181a which correspond to the level $N_2$ displace their associated blocking pins provided in the bores 164, 166, respectively, a further predetermined amount. If the key 181a is correct and corresponds to the design of the lock of the actuating rod 151 then the locking pin segments 168, 178 and 179 appearing in the corresponding bores 161, 164, 166 will be displaced into the associated bores in the actuating rod 151 in such a manner that this actuating rod 151 is released and will move quickly upwards under the influence of the compressed spring member 192. The movement of the actuating rod 151 can be utilized to open the lock of a drawer, cabinet, door, closet or otherwise. Further, the respective actuating rods 151–155 can be returned into their locking position by means of the separate return spring members 197, whereas the pins in the bore members 161–166 are returned into their normal locking position by means of the springs 198 arranged in lock housing 45.

Since it is also possible to design such a lock arrangement for each actuating rod, such as actuating rod 151 to consist of two tandemly arranged rows of pin members arranged on a substantially flat surface, the key member 181a must then also be provided with a pair of tandemly arranged contact pins also arranged on a flat surface and, in a manner similar to the embodiments already described previously. As should be readily apparent, the remaining lock constructions for the actuating rods 152–155 and their associated key member 192a–195a are then similar to that just described in conjunction with actuating rod 151 and key member 181a, so that a further description thereof can be dispensed with.

In the variant form shown in FIG. 20 there is shown a cylinder housing 207 provided with the vertically arranged pins 201, 202 adapted to displace the horizontal pins 203, 204 acted upon by the spring members 205 and 206, respectively. Consequently, the horizontally arranged pins 203, 204 either block or free the rotatable cylinder or plate 207 of the stationary lock cylinder 208. As can be seen from the drawing, the vertical pin members 201 and 202 are each provided with a recess 201a and 202a, respectively, adapted to receive the innermost respective ends of the pin members 203 and 204, respectively. The other end of the pin members 203 and 204 is adapted to normally rest within recesses 208a and 208b provided in the stationary cylinder 208. Thus, when the pins 201 and 202 are downwardly displaced by a suitable key through the openings 201b and 202b of rotatable plate or cylinder 207, the horizontal pins 203 and 204 will move into the recesses 201a and 202a to thereby free the cylinder 207 to actuate a lock member or the like. Naturally, any number of pin members 201, 202 and 203, 204 can be employed. It is to be understood that further pin members are arranged above and below vertical pins 201, 202 as in the arrangement of FIG. 1.

Figure 26:
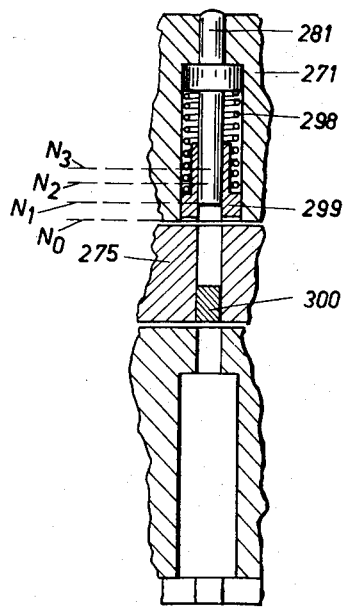
FIG. 26 is a fragmentary, cross-sectional view showing the details of a portion of the lock of FIG. 21.
Figure 29:
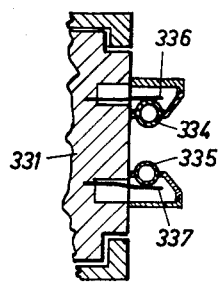
FIG. 29 is a fragmentary, cross-sectional end view of the lock and guide arrangement of FIG. 28.
Figure 30:
FIG. 30 is a fragmentary view of the key for the lock of FIG. 28.
Figure 31:
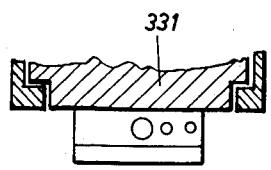
FIG. 31 is a cross-sectional view showing details of the guide means of FIGS. 28 and 29.
Figure 32:
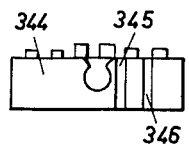
FIG. 32 is an end view showing details of the guide slots for the arrangement of FIG. 31.

FIGS. 21 and 26 illustrate a frontal lock provided with an individual key 287 (FIG. 25) as well as a master or pass key 291. The lock housing may consist of two rotatable cylinders or plates 271, 272 rotatably connected to one another by means of the fastening members 273, 274 and which are blocked relative to a fixed cylinder 275 by means of suitable pin members substantially in the manner as previously described with reference to FIG. 1. These pin members are divided into two groups as for example: A number A equal to six groups of active pins such as members 276–278 (three of the pin groupings not shown and lying behind the plane of the drawing of FIG. 21) with each active pin grouping being provided with three active pins brought into the locking position by means of the spring members 279. A number R equal to six reactive pins such as members 281, 282 and 283 (again three are not shown) which block the rotatable cylinders in the event of insertion of a false or incorrect key. The active pins 276–278 are freed by means of the corresponding active contact pin members 284–286 of the individual key 287 (FIG. 25), or by means of the identical pins 288–290 of the pass key 291 (FIGS. 23 and 24). The active pins 276–278 can be constructed for example to exhibit $N=4$ levels such as levels $N_0$, $N_1$, $N_2$, $N_3$. In contrast thereto, the position of the corresponding reactive pins 281–283 will not be changed by the cooperating reactive contact pins 292–294 of the pass key 291 since these contact pins 292–294 are located at the level $N_0$. The level of reactive pins 295–297 of the individual key member 287 differs from the reactive contact pins 292–294 of the pass key 291 by the height of at least one pin member, such as the pin 295, constructed to correspond to the level $N_1$ which differs from the level $N_0$.

The corresponding reactive pin 281 of the lock is likewise constructed as by being made shorter in length so as to correspond to the level $N_1$ which also differs from the level $N_0$. Thus, the reactive pin member 281 does not block the rotatable cylinders 271, 272 irrespective whether the level of the pin 295 of the individual key 287 or the level of the pin 292 of the pass key 291 corresponds to the levels $N_1$ or $N_0$. The reactive pins 281 are brought into their normal rest position by means of a spring 298 arranged in a corresponding bore of the outermost cylinder 271. This spring may have the same force as the respective springs 279 of the active pins 276–278, the latter of which are arranged in the innermost rotatable cylinder 272. The lock is so constructed that the path of displacement of the reactive pins such as pin 281 is identical with that one of the active pins 276–278 since it is limited by means of a hollow ring 299 arranged in the outer rotatable cylinder 271 (FIG. 26), or alternatively, by means of a stopper 300 for example which is positioned in the fixed plate 275 (FIG. 21). Consequently, it is not possible from externally of the lock to distinguish between the active pins and the reactive pins and the secret of the lock is protected. Of course any of the other measures heretofore described can be employed to make the lock difficult to probe in order to protect the secret of the lock.

The reactive pin 283 possesses a single neutral level such as $N_0$. On the other hand the reactive pin 281 possesses two neutral levels such as $N_1$ and $N_0$. It is to be understood under the term "neutral" level that a condition exists wherein the rotatable cylinders 271, 272 are not blocked by the corresponding pin members, with the condition that the key is the proper one. The neutral level of at least some of the reactive pins 281, 282 can be from $N_0$ to $N_4$, with the condition that the pins 281, 282 are correspondingly shorter by one or two or three levels for example.

As a variant construction of the invention it would be possible to achieve neutral levels by employing reactive pins constructed such as pin members 282 which are not decreased in length. In such a construction however, the fixed plate 275 and the rotatable plate 272 is provided with semi-circular recesses 301, 302, the depth of which corresponds to at least one level. The pins 303, 304 (FIG. 22) which are arranged in crosswise manner permit the laterally arranged active pins 281 and 283 to assume the same position irrespective if the lock is open or closed, when the angle of rotation assumes a quarter turn as generally indicated by reference number 308.

In the arrangement of FIG. 27 there is shown the possibility of positioning the two rows of pins 305, 306 such that they are offset with respect to one another, whereby the recess 307 passes between the pins of the other row. The pass key 291 (FIG. 24) or the individual key 287 (FIG. 25) may be provided at its edges with the leg members 311, 312, 313, 314 which possess a height corresponding to a reference level $N_0$ and thus reduces the possibility of disturbing the function of the key by dirt or foreign particles. It is to be appreciated as already previously described that the positive and negative portions of the key and lock combinations can be reversed; that is to say, the pins of the key can be replaced by recesses and the pins of the lock can extend externally of the lock, similar to the arrangement shown in FIG. 16. In the arrangement of FIGS. 21–27, the total number of contact points D can be divided into two groups, namely, $A$=number of active contact points (which in the rest position block) and $R$=number of reactive points (which do not block in the rest position). The number R determines the maximum number of different pass keys, i.e. $C_p=(N-1)^R$. The number A determines the maximum number of different individual keys, i.e. $C_i=N^A$ which are associated with a given pass key. The following chart illustrates, by way of example, the number of theoretically possible pass keys $C_p$ and individual keys $C_i$ per pass key in the case where $D=12$ contact points and where $N$=four possible levels.

| Active points (A) | 3 | 4 | 5 | 6 |
|---|---|---|---|---|
| Number of pass keys | $3^3=27$ | $3^4=81$ | $3^5=243$ | $3^6=729$ |
| Reactive points (R) | 9 | 8 | 7 | 6 |
| Number of individual keys | $4^9=262,144$ | $4^8=65,536$ | $4^7=16,384$ | $4^6=4,096$ |
| Total number of keys | $7\times10^6$ | $5.3\times10^6$ | $4\times10^6$ | $3\times10^6$ |

| Active points (A) | 7 | 8 | 9 |
|---|---|---|---|
| Number of pass keys | $3^7=2,187$ | $3^8=6,561$ | $3^9=19,683$ |
| Reactive points (R) | 5 | 4 | 3 |
| Number of individual keys | $4^5=1,024$ | $4^4=256$ | $4^3=64$ |
| Total number of keys | $2.2\times10^6$ | $1.7\times10^6$ | $1.26\times10^6$ |

As a practical matter, it is only possible to employ approximately 90% of the above calculated number of pass and individual keys, since one must avoid using those combinations which are too easy to determine.

In the arrangement of FIGS. 28–32 it is possible to increase the number of non-exchangeable keys with the aid of recesses or mechanical barriers or obstacles. Thus, the rotatable cylinder 332 carries a pair of blocks 331, 333, each of which supports the stop or abutment spheres 334, 335 acted upon by the spring members 336, 337. The two block members 331, 333 are provided with the lateral pins 341–343 which match with appropriate grooves 345, 346 (FIG. 32) provided for the key 344 so that the key can be correctly pressed against the lock cylinder 332 and the movable contact pins 347, 348 can be freed. The fixed pins 341–343 are arranged asymmetrical in relation to the center axis in order to indicate the correct positioning of the key 344.

In FIGS. 33–38 there is shown a double-face or alternate side lock and key arrangement, that is to say, a lock that can be opened or closed from two sides. Such locks for example are of the type used at the front door of a building or of an apartment and which can be locked and unlocked by a suitable key from either side of the door. The double-lock arrangement of FIG. 33 is formed of the cooperating lock members 351, 352 mounted on opposite sides of a door panel. Each lock member 351, 352 is constructed in a manner substantially similar to the lock of FIG. 1. Thus, each lock consists of a pair of rotatable cylinders or plate members 354, 355 separated by a fixed cylinder or plate member 356. However, in this embodiment the two rotatable plates 354, 355 of each lock are rigidly connected to one another by means of a central rectangular sleeve member 357. Coaxially arranged in the rectangular sleeve member 357 is a push rod 358. When the key 359 (FIG. 35) is pressed against the lock 351, the middle contact pin 360 of said key displaces the push rod 358 against the force of a spring 361 mounted in a suitable recess provided in the oppositely arranged lock member 352. The push rod 358 actuates a coupling member 362 to move the latter through a suitable opening 362a provided in a central sleeve member 363 arranged between the lock members 351, 352. This movement of the push rod 358 disengages the blocking action of the lock 352 and the connecting or coupling member 362 moves into a suitable slot provided for the sleeve 363. The rotational movement of the key member 359 then carries along one of a pair of cam projections or fingers 364 cooperating with sleeve member 363 to thereby displace a locking bolt 365 for example. In the central sleeve member 363 there are arranged two cross shaped slots 367, 368, whereby a quarter turn of the key 359 proves sufficient.

In FIGS. 39–44 there is disclosed a further variant form of the lock of the present invention, whereby the previously described rotational movement of the locking plate or cylinder is replaced by a linear movement. The linearly movable plate member 401 arranged in the lock housing 401a is blocked by means of twelve pins, such as the intermediate pin members 402 and actuates a locking bolt or member 403 through the intermediary of the spring members 411, 412. If the key 404 (FIG. 43) is pressed against the lock 405 then a two piece central piston member 406, 406a compresses the springs 407, 408 as soon as the intermediate pins 402 have reached the corresponding level of the linearly movable plate 401. It is to be seen that each bore 401b of the lock 405 is provided with the pin members 402, 402a, 402b acted upon by the spring members 401c. The pin members 402, 402a, 402b and spring members 401c of each bore 401b are constructed so that for all practical purposes the lock 405 cannot be readily probed or tested, and a high degree of security prevails. The plate 401 is provided with a slot 401d to permit sliding movement thereof relative to piston member 406, 406a. As shown in FIGURE 40, the plate 401 and the bolt 403 are telescopically engaged with interengaging flanges which are normally held in engagement with one another due to the biasing effect of springs 411, 412. Thus, when the plate member 401 is retracted, it will in turn, retract the bolt member 403 due to the telescoped interengaging flange arrangement. Retraction of the plate member 401 is accomplished by a lower piston portion 406a which is acted upon by springs 407, 408 and by a double arm lever 409 providing a force direction changing member which is adapted to slide in a recess 410 provided in the movable locking plate member 401. A spring 413 operable upon the rear end of plate 401 biases the plate 401 back into its rest position as soon as the key 404 is removed from the lock 405. If the door is slammed shut then the force acting upon the bolt 403 is sufficient to momentarily press together the springs 411, 412 arranged between the bolt 403 and slidable plate 401. A manually actuatable link 414 (FIG. 41)

permits securing the bolt 403 from the inside of a room for security purposes, with such securing being accomplished by movement of the end of the link 414 into a hole in the bolt 403.

In FIGS. 45–52 there is shown a further variant form of lock designed according to the teachings of the present invention which also does not require turning of the key to open the lock and arranged in combination with a handle or hand grip. It is to be assumed that a locking bolt (not shown) is to be actuated by a spindle 451 mounted in a hollow rotatable hand grip. The hand grip consists of a frame portion 452 and a cap member 453a. The frame portion 452 is rotatably mounted or journaled in a cylinder or sleeve 453. The frame 452 is returned into its normal or original position of rest by means of a spiral spring 454 disposed in sleeve 453. The sleeve member 453 is provided with the grooves or slots 455 cooperating with the cams or projections 456 of the frame 452 in order to limit rotation of the hand grip, as best seen in FIG. 48. The hand grip in its non-operating or rest position does not actuate the spindle 451 actuating the bolt, but rather, rotates freely thereabout. If it is desired to rotate the spindle 451 in conjunction with the hand grip, then it is necessary to insert the key 457 (FIGS. 49 and 50) into the lock 458. The pin member 459 (FIG. 50) of the key 457 engages a pin 459b in a bore 459a which in turn actuates a cantilever spring 460 providing a force direction changing member designed to displace the movable push rod 461 in the direction of the longitudinal axis of the handle and against the action of the weaker leaf spring 462 located in the key housing 458. Such displacement of rod 461 occurs as soon as all of the contact pins 463 of the key 457 have actuated the associated pins 464 to move into their neutral level with respect to the rod 461 so that the movable rod 461 is able to engage the coupling or connecting portion 465 of the spindle 451. As a result, the spindle 451 is rigidly coupled with the hand grip, so that the bolt member (not shown) can be actuated, for example, in order to open a car door or an apartment door. The hand grip is also provided with a pivotable lever 466 which is normally acted upon by a spring 467 secured to cap member 453a and engages by means of a pin 466a a recess 466b provided in the movable rod 461 in order to maintain said rod in its spindle coupling position. In order to again disengage the spindle 451 from operative movement with the hand grip it is sufficient to press upon the pivotable lever 466 extending through opening 466c of cap member 453a, assuming that the key member 457 has been removed from the lock 458. Since the details of the lock arrangement 458 are substantially similar to those of the previously described locks, such as substantially shown in the lock construction of FIGS. 39–42 for example, no further discussion thereof is believed warranted.

In accordance with the embodiment of FIG. 55, it is possible to construct a finger ring key 471 so that instead of possessing positive contact pins it is provided with suitable bores or recesses 472a adapted to accommodate correspondingly designed outwardly extending pins provided on the lock 472. The recesses 472a can either be constructed in the form of bores 473 provided in the ring body 474 (FIG. 57) or else in the form of recesses 475 arranged at the lateral edges of the ring 476 (FIG. 56). If desired it is possible to arrange four keys 477–480 (FIGS. 58 and 59) on the same ring. The keys may be constructed so as to be exchangeable on the ring body 481 by means of different fastening arrangements, such as conical guides, pins and other expedients generally known to the art. As a variant form of the invention there is shown in FIG. 60 a lock 482 which can be arranged on the upper or lower side of a handle 483 rather than at the inside thereof as previously shown in FIG. 45. It is thus possible to engage the handle 483 with a single finger and to unlock and turn the same with comparative ease. A similar relatively simple mode of movement can be performed by means of the pivotable handle 484 of FIG. 61. This handle 484 is designed to rotate about the pivot axis 485 which has been displaced 90° relative to the pivot axis of the embodiment of FIG. 60. Further the lock 486 is shown arranged on the inner face of the handle portion 484.

In FIG. 62 there is shown a decorative signet ring which has the initials J. D. The decorative motif is formed from a plurality of contact points depicted by black and white dots, and which cannot readily be distinguished from one another by visual observation. For example, the black dots can serve the herein described mechanical function for actuating a lock in accordance with the teachings of the present invention, whereas the white dots or contact points are purely decorative and serve as a decoy in making it difficult for one to determine the combination of the lock. The white contact points of the key may enter suitable bores of the lock or may displace false or fictitious pins provided in the lock. The foregoing arrangement is particularly noteworthy in protecting the secret of the lock and also that of the key, especially if the latter should become lost.

In FIGS. 63 and 64 there is shown a further lock arrangement combined with a hand grip 501a formed of the housing members 501, 502 connected together by screws 524, 525 and arranged so as to be pivotable about the axis of the square shaft 503, similar to the arrangement of FIG. 61. In a manner as previously described in conjunction with the embodiment of FIGS. 45–54, when the key 504 (FIG. 64) is inserted into the lock 505, the details of which correspond substantially to the lock arrangement of FIG. 50, then the linearly movable push rod 506 is displaced by the spring 507 providing a force direction changing member and which acts against the leaf spring 508, so that said movable push rod 506 is urged against pivot lever 509. As a result, the pin 511 of spring member 510 and carried by hand grip 501a engages a recess 506a of the push rod 506 to hold the latter against the pivot lever 509. Consequently, the housing members 501, 502 of hand grip 501a are rigidly connected to the pivot lever 509. The springs 512, 513 are provided to hold the square shaft in its normal rest position. If the hand grip 501a is pivoted through the angle denoted by reference numeral 515, then a locking catch or bolt 516a is displaced against the action of a spring 517 arranged in the housing portion 517a. Thus, a door 518 (FIG. 64) which may be a car door can be opened.

If thereafter the hand grip 501a is displaced in the direction of arrow 516, and in the direction of the door member 518, then the curled end 519 of the spring 510 assumes the position shown in phantom lines by reference numeral 520, abutting against the lower inclined surface of the lever 509. During such movement of the hand grip 501a, the lever 509 remains in its position due to the constraining action of very strong springs 512, 513 which act upon the square shaft 503 which serves as the pivot of the hand grip. Consequently, as the hand grip 501a moves relatively to the lever 509, the spring 510 is caused to move from its solid line position 519 to its dotted line position 520. Such movement causes the pin 511 projecting from the spring 510 to pull out of the recess 506a in the push rod 506. Once the pin 511 is removed from the recess, the push rod is displaced to the left, in the orientation of FIGURE 64, under the action of the pressure of the leaf spring 508. When the push rod thus moves to the left, any coupling connection between the hand grip 501a and the lever 509 is released, and thus return movement of the hand grip in the direction of the arrow 515 will not bring about actuation of the lever 509 and of the door bolt 516a.

For security purposes, it is possible to provide a further lock unit 522, which may be similar to the lock arrangement of FIG. 1 for example, and which can be actuated by the same key provided for the lock unit 505. It is to be noted, however, that the key 504 is worn on the inner surface of the hand when opening lock unit 505 and is turned 180 degrees about the finger to open lock unit 522. The lock unit 522 is operatively coupled to a rod 523, and when such lock unit is actuated, the rod 523 is displaced into the operating zone of the bolt 516a to move into blocking position behind a flange 530 depending therefrom. When the rod 523 is so disposed behind the flange 530, it prevents retraction of the bolt member 516a.

Naturally, many variant forms of a finger ring key are possible and will be evident to those skilled in the art. It is to be appreciated that a setting of precious stones on a decorative ring can be at least partially suited and accommodated for mechanical purposes of actuating a lock structure designed according to the present invention as disclosed herein. It will be apparent from the foregoing description that many changes and modifications are readily possible without departing from the spirit and scope of the present invention. Moreover, one or more of the various features of the individual embodiments disclosed herein may be combined in a specific lock and key structure, as a particular situation might require. It is also to be appreciated that the key may be provided with positive or negative contact points i.e., projecting pins or bores, and the associated lock must obviously then be suitably designed. In all embodiments disclosed suitable measures as for example disclosed herein are undertaken to safeguard against probing of the lock.

Furthermore, the movable plate may be arranged between two stationary plates as shown in FIG. 39, or the stationary plate may be arranged between two movable plates as in FIG. 1. The advantage is that each coaxial pin group is used twice for the locking action. Of course, as a simplified variant, one of the two movable plates, or one of the two stationary plates may be dispensed with. In a most simplified embodiment of the invention the bolt 403 and movable plate 401 for example in the lock shown in FIG. 40, may be directly displaced by the inserted key. It is further to be understood that one or more substantially parallel rows of contact pins may be provided for the key and naturally the lock must be then correspondingly designed. Also, it is possible to provide a lock and key arrangement having randomly arranged contact points. Moreover, the keys can be combined with many other articles of jewelry or otherwise, such as a watchband for example.

Having thus described the present invention what is desired to be secured by United States Letters Patent, is:

1. In a frontal type lock arrangement, a movable member selectively displaceable into one of two operable positions, one position corresponding to opening of the lock and the other position corresponding to a closed lock, blocking means cooperating with said movable member adapted to be displaced by a key when inserted in said lock into a first position for freeing said movable member to carry out a desired movement, said blocking means normally assuming a second position when said key is not inserted in said lock for blocking said movable member from carrying out said desired movement, first spring means for normally urging said blocking means into said second position for blocking said movable member, means including a second spring means movable by a key inserted in the lock for displacing said movable member into said one position corresponding to opening of the lock when said blocking means are displaced into said first position, and third spring means for returning said movable member into said other position corresponding to a closed lock when the key is removed from the lock for blocking of said movable member by said blocking means.

2. In a frontal type lock arrangement as defined in claim 1, said means for displacing said movable member comprising a displaceable rack operable with said second spring means for compressing the latter when said key is inserted in the lock.

3. In a frontal type lock arrangement as defined by claim 1, wherein said means for displacing said movable member includes a piston member defined by two spaced elements, said second spring means being disposed in the space between said two elements, said movable member being provided with a slot, one of said two spaced elements extending into said slot, said slot being larger than said element extending thereinto to permit sliding movement of said movable member relative to said piston member.

4. In a frontal type lock arrangement as defined in claim 3, wherein said means for displacing said movable member further includes a double arm lever having one lever arm operatively connected with said movable member and having the other lever arm thereof being actuable by said piston member for directly displacing said movable member into said one position.

5. In a frontal type lock arrangement as defined in claim 1, including means for detachably receiving said key and providing an elastic coupling for demountably receiving and holding said key.

6. In a frontal type lock arrangement as defined in claim 5, said detachable receiving means including a pair of diametrically spaced, spring biased, ball members between which said key is inserted.

7. In a frontal type lock arrangement as defined in claim 1, wherein said movable member is constructed as a slidable rod displaceable into an actuating position in which it is adapted to be connected with a member to perform an unlocking function, means cooperating with said slidable rod to retain such in said actuating position.

8. In a frontal type lock arrangement as defined in claim 7, wherein said slidable rod is provided with a recess, said cooperating means including a pin member movable into said recess for retaining said rod in said actuating position, and means for withdrawing said pin member from said recess to free said slidable rod for return movement back into its original position.

9. In a frontal lock arrangement as defined in claim 8, including a hand grip, a spindle member defining said member adapted to perform an unlocking function, said hand grip and said spindle member being mounted for independent relative movement, and a coupling member on said spindle member, said slidable rod when in said actuating position engaging said coupling member for coupling said spindle member with said hand grip.

10. In a frontal type lock arrangement as defined in claim 8, including a hand grip, a shaft member for pivotally supporting said hand grip, a lever pivotally supported by said shaft member and defining said member performing an unlocking function, said slidable rod when in said actuating position operably engaging with said lever to couple said hand grip with said lever, said hand grip being pivotal into a first position to pivot said lever to cause the latter to perform its unlocking function and being pivotal into a second position to withdraw said pin member from said recess of said slidable rod.

11. In a frontal type lock arrangement, a movable member selectively displaceable to carry out a linear movement into one of two operable positions, one position corresponding to opening of the lock and the other position corresponding to a closed lock, blocking means cooperating with said movable member adapted to be displaced by a key when inserted in said lock into a first position for freeing said movable member to carry out said linear movement, said blocking means normally assuming a second position when said key is not inserted in said lock for blocking said movable member from carrying out said linear movement, first spring means for normally urging said blocking means into said second position for blocking said movable member, means including a second spring means movable by a key inserted in the lock for displacing said movable member into said one position corresponding to opening of the lock when said blocking means are displaced into said first position, and third spring means for returning said movable member into said other position corresponding to a closed lock when the key is removed from the lock for blocking of said movable member by said blocking means.

12. In a frontal type lock arrangement, a plurality of movable members selectively displaceable into one of two operable positions, one position corresponding to opening of the lock and the other position corresponding to a closed lock, blocking means cooperating with said movable members and adapted to be displaced by a key inserted in said lock into a first position for freeing said movable members to carry out a desired movement, said blocking means normally assuming a second position when said key is not inserted in said lock for blocking said movable members from carrying out said desired movement, first spring means for normally urging said blocking means into said second position for blocking said movable members, means including a second spring means movable by a key inserted in the lock for displacing said movable members into said one position corresponding to opening of the lock when said blocking means are displaced into said first position, and third spring means for returning said movable members into said other position corresponding to a closed lock when the key is removed from the lock for blocking of said movable members by said blocking means.

13. In a frontal type lock arrangement as defined in claim 12, wherein said blocking means include individual groups of blocking members each cooperating with a respective one of said movable members and movable into said first and second positions for freeing and blocking, respectively, an associated one of said movable members, said second spring means comprising a separate spring member cooperating with each movable member.

14. In a frontal type lock arrangement, a movable member selectively displaceable into one of two operable positions, one position corresponding to opening of the lock and the other position corresponding to a closed lock, blocking means cooperating with said movable member adapted to be displaced by a key which exerts a purely frontal directed force when inserted in said lock with said blocking means moving into a first position for freeing said movable member to carry out a desired movement, said blocking means normally assuming a second position when said key is not inserted in said lock for blocking said movable member for carrying out said desired movement, first spring means for normally urging said blocking means into said second position for blocking said movable member, means including a second spring means movable by a key inserted in the lock for displacing said movable member into said one position corresponding to opening of the lock when said blocking means are displaced into said first position, third spring means for holding said movable member in said other position corresponding to a closed lock when the key is removed from the lock for blocking of said movable member by said blocking means, said means for displacing said movable member including a force direction changing means operable to exert a force on said movable member.

References Cited by the Examiner

UNITED STATES PATENTS

| 41,177 | 1/64 | Harold | 70—363 |
| 51,152 | 11/65 | Dietz | 70—363 |
| 52,226 | 1/66 | Toll | 70—363 |
| 59,628 | 11/66 | Mullett | 70—393 |
| 156,645 | 11/74 | Miller | 70—405 |
| 240,397 | 4/91 | Ehmer | 70—363 X |
| 1,446,132 | 2/23 | Skublin | 70—363 |
| 1,714,579 | 5/29 | Werner et al. | 70—409 X |

FOREIGN PATENTS 333,162  12/35  Italy.

ALBERT H. KAMPE, *Primary Examiner.*